UNITED STATES PATENT OFFICE.

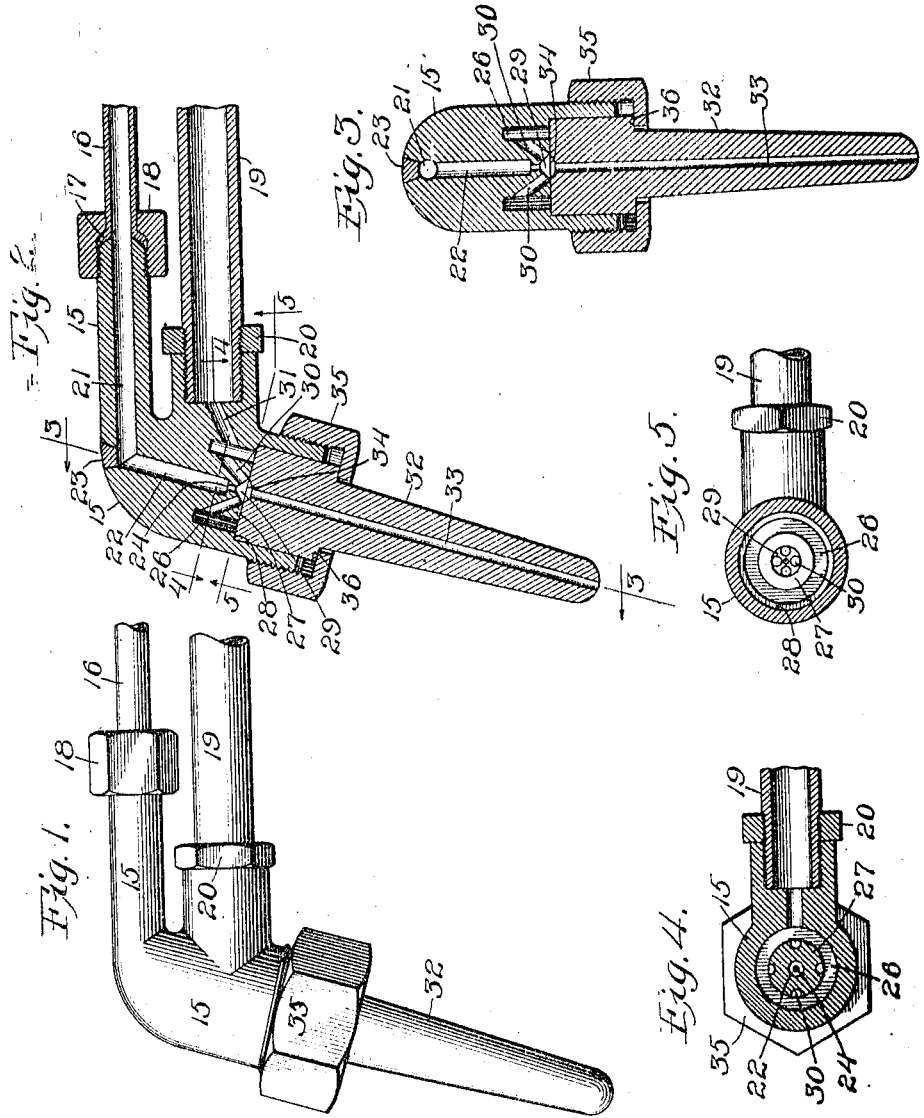

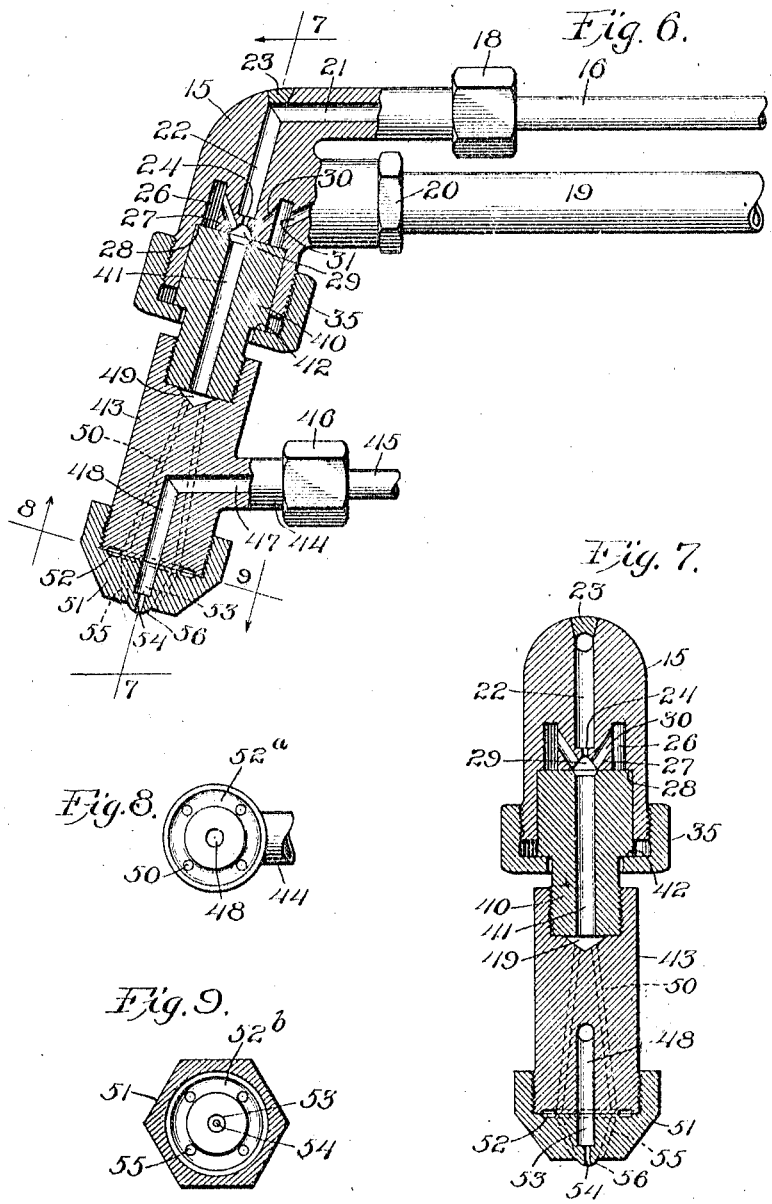

CARL JOHNSON, OF CHICAGO, ILLINOIS.

ACETYLENE-TORCH.

1,020,559. Specification of Letters Patent. Patented Mar. 19, 1912.

Application filed April 18, 1911. Serial No. 621,911.

*To all whom it may concern:*

Be it known that I, CARL JOHNSON, a citizen of the United States, residing at Chicago, in the county of Cook and State of Illinois, have invented certain new and useful Improvements in Acetylene-Torches, of which the following is a specification.

The principal object of my invention is to provide a new and improved acetylene torch.

Another object of my invention is to provide an acetylene torch with interchangeable tips for welding or cutting purposes.

Another object of my invention is to provide an acetylene torch so designed that it can be readily and securely assembled or taken apart.

These objects and various others will be readily appreciated in connection with the following specification and claims, taken with the accompanying drawings.

In these drawings I have illustrated one particular embodiment of my invention, but the invention itself is defined in the appended claims.

Figure 1 is an elevation of the torch with the welding tip. Fig. 2 is a sectional view corresponding to Fig. 1. Fig. 3 is a sectional view on the line 3—3 of Fig. 2. Figs. 4 and 5 are sections on the lines 4—4 and 5—5 of Fig. 2. Fig. 6 is a section of the torch with the cutting tip. Fig. 7 is a section on the line 7—7 of Fig. 6. Figs. 8 and 9 are views taken approximately on the line 8—9 of Fig. 6, looking respectively in the directions of the like numbered arrows, the cap being omitted from Fig. 8.

I will first describe the torch with the welding tip, as illustrated in Figs. 1 to 5. The head 15 has an oxygen supply pipe 16 with the flange 17 at its end clamped in place by the nut 18. The acetylene supply pipe 19 is screwed into a threaded boss and locked by the nut 20. The channels 21 and 22 are drilled and then after the drill is removed the end of the channel 22 is plugged, as indicated by 23. The extreme end of the channel thus formed is prolonged in a very small hole 24 which opens into a countersink or depression 29. An annular channel 26 is bored out in the head 15 so as to leave a central boss 27 surrounded by this channel 26. Diverging holes 30 are drilled in the boss 27 so as to connect the countersink 29 with the annular channel 26. A hole 31 is drilled to connect the pipe 19 to the channel 26. A shoulder or ledge 28 is formed in the head 15 in the same plane with the end face of the boss 27. The welding tip 32 fits within the end of the head 15, its end face lying close against the shoulder 28 and the end face of the boss 27. The tip 32 has a central duct 33, leading from the countersink 34, that registers with the countersink 29 in the boss 27. The tip 32 has a shoulder 36, and the nut 35, acting against this shoulder, clamps the tip tightly in place so that its inner end fits tight against the shoulder 28 and the boss 27.

It will be seen that the torch is solid and substantial, comparatively easy to manufacture, easy and simple to assemble or take apart, and keep in order in the hands of either skilled or unskilled workmen.

The acetylene supply, coming along the pipe 19, goes through the duct 31 into the annular channel 26, and thence converges through the four ducts 30 into the countersink 29. The oxygen supply, coming along the pipe 16 and the duct 21—22—24, enters the same countersink 29. The two registering countersinks 29 and 34 constitute a mixing chamber for the oxygen and acetylene. From this mixing chamber the mixture goes along the duct 33 in the tip 32 and discharges at the end of this tip 32 where it is burned. When it is desired to transform the torch, so as to adapt it for cutting metal, this may readily be done by unscrewing the nut 35, removing the tip 32, and replacing it by the tip shown in Figs. 6, 7, 8 and 9. These figures just referred to show the torch assembled with the metal cutting tip, which will now be described.

It will be seen that the head 15 and the nut 35 are the same as in Figs. 1 to 5. The nut 35, acting on the shoulder 42, clamps the member 40 against the shoulder 28 and the end face of the boss 27. This member 40 has a central axial duct 41 which registers with the countersink 29. A second member 43 is screwed tightly to the free end of the first member 40. This second member 43 has a lateral projection 44 with a hole 47 drilled axially therein. An auxiliary oxygen pipe 45 connects by means of a nut 46 to the projection or boss 44. A duct 48, drilled in the end of the member 43, connects with the duct 47. The second member 43 has a countersink 49 in registry with the end of the duct 41 and in the first member 40. Four small ducts 50 are drilled in the member 43 so as to lead from the countersink 49 to the opposite end of the member 43. The cap or tip 51 is screwed on the end of the member 43 and the said member 43 and the said cap 51 have respective registering annular channels 52ª and 52ᵇ which, when the parts are assembled, form an annular chamber 52. The ends of the four ducts 50 open into this annular chamber 52. Four more ducts 55 are drilled through the cap 51, so as to lead from the annular chamber 52 to the front face of the cap 51. A duct 53 is drilled centrally in the cap 51 in registry with the duct 48 in the member 43. This duct 53 is continued at its end, reduced in size as designated at 54, and the cap has a slight bead or projection 56 through which the duct 54 opens centrally. The ducts 55 open close around this bead 56.

It will be seen that the oxygen, supplied through the pipe 16, and the acetylene through the pipe 19, mingle in the mixing chamber 29. Thence the mixture goes axially through the duct 41 into the countersink 49, thence through the diverging ducts 50 into the annular chamber 52, and thence through the converging ducts 55 to their outlet ends on the face of the cap 51. The auxiliary oxygen supply through the pipe 45 goes through the duct 47—48—53—54 and discharges in the center of the mixed oxygen and acetylene from the ducts 55. This produces a highly effective cutting flame.

It will be seen that this torch, as shown in Figs. 6, 7, 8 and 9, is easy to put in place of the cutting tip shown in the earlier figures of the drawings. The two members 40 and 43 can be screwed tight together and then the two of them can be turned, so as to bring the projection 44 in parallelism with the pipes 16 and 19; thereafter the nut 35 can be tightened.

It should not be supposed that the ducts 55 necessarily register with the ducts 50 for this is not necessary. The cap 51 can be screwed on tightly and if these ducts just referred to do not register the annular chamber 52 will connect them together. It will be observed that in removing the cutting tip of Figs. 6, 7, 8 and 9, it is simply necessary to loosen the nut 35. The three members 40, 43 and 51 may be kept permanently assembled together as shown.

I claim:

1. In a device of the class described, a head comprising a one-piece metal member having two ducts drilled therein, one of said ducts extending axially, said member having an annular chamber cut therein around the axial duct and connected to the other duct, and said member having converging ducts drilled therein connecting the said annular chamber to the axial duct.

2. In a device of the class described, a head comprising a one-piece metal member having ducts for oxygen and acetylene drilled therein and also having an annular channel cut in one face of the metal member around the oxygen duct and connected to the acetylene duct, thus forming a boss in said face of the metal member, said boss being surrounded by said channel, said oxygen duct leading axially through said boss, and said boss having a countersink on its face at the end of said oxygen duct, said boss also having converging ducts drilled therein from the annular channel to the said countersink, in combination with a tip having a duct therein, said tip being adapted to be fastened securely against the face of the boss so as to cover and close said annular channel and have its duct connecting to the said countersink.

3. In a device of the class described, a head having a socket in its end to receive a tip and having an annular channel cut at the bottom of said socket and located so as to leave a shoulder outside the channel as well as a boss inside thereof, in combination with a tip adapted to fill said socket and lie closely against the end of the boss and against said shoulder, said tip having a duct therein.

4. In a device of the class described, a head comprising a one-piece metal member, oxygen and acetylene supply pipes connected thereto, said metal member having ducts drilled therein leading from said pipes, the duct from the oxygen pipe being constricted near its end remote from the corresponding supply pipe and opening thence on a face of the metal member, said metal member also having a countersink where said oxygen duct opens and having a deep annular channel cut around said countersink and connected to the acetylene duct and having converging ducts from said channel to said countersink, in combination with a tip having a duct therethrough connecting with said countersink.

5. In a device of the class described, a head comprising a one-piece metal member, oxygen and acetylene supply pipes connected thereto, said metal member having ducts drilled therein connecting with the respective pipes, the duct from the oxygen pipe being constricted near its end remote from said pipe and opening thence on the face of the metal member, said metal member also having a countersink where said duct opens on the face of the metal member and having a deep annular channel cut around said countersink and connected to the acetylene duct, in combination with a tip fitting closely over said annular channel and thereby closing the same, said tip having an axial duct extending therethrough from said countersink.

6. In a device of the class described, a head comprising a one-piece metal member having ducts drilled therein for oxygen and acetylene and having a mixing chamber therein for said gases, in combination with a three-piece tip connected to said metal member, the member of said tip adjacent to said metal member having an axial duct leading from the mixing chamber in the metal member, the next member of the three-piece tip having a countersink to which said duct leads, also having diverging ducts therefrom and also an auxiliary oxygen supply connection and a duct therefrom located centrally for part of its length with respect to said diverging ducts, and the third member of said three-piece tip having a constricted central duct in continuation of the duct in the second member from the auxiliary oxygen supply and having converging ducts connected to said last mentioned diverging ducts and surrounding said constricted discharge for the auxiliary oxygen.

7. In a device of the class described, two members adapted to be screwed together, said members having opposed annular channels on their meeting faces located and adapted to form an annular chamber when assembled, said members having registering axial ducts, a plurality of ducts around the axial ducts in each member connected, respectively, to the said annular channels therein, one of said members having its axial duct continued to one side, a boss on said member, said last named duct extending therethrough, and this same member having a screw-threaded socket on the end away from said annular channel.

8. In a device of the class described, a head having a cylindrical socket in its end, a tip having a cylindrical end to fit therein, said head having an annular channel cut therein at the bottom of said socket, the major diameter of the annular channel being less than the internal diameter of the socket, whereby a shoulder is left at the bottom of the socket, and a boss surrounded by the said channel, said tip fitting tightly against said shoulder and boss and thereby completely closing the channel, said head and tip having central alining ducts, the duct in the head extending through the annular boss and said annular boss having branch ducts therein connecting the said central duct to the said annular channel, and supply connections to said central duct and to said annular channel.

In testimony whereof, I have subscribed my name.

CARL JOHNSON.

Witnesses:
 HENRY A. PARKS,
 FLORENCE A. FLORELL.